US012418256B2

(12) United States Patent
Hobbs (10) Patent No.: US 12,418,256 B2
(45) Date of Patent: Sep. 16, 2025

(54) CONTROL SYSTEMS AND METHODS WITH HAPTIC FEEDBACK

(71) Applicant: Nodal Film Systems LLC, Los Angeles, CA (US)

(72) Inventor: Boyd Randolph Hobbs, Los Angeles, CA (US)

(73) Assignee: Nodal Film Systems LLC, Los Angeles, CA (US)

( * ) Notice: Subject to any disclaimer, the term of this patent is extended or adjusted under 35 U.S.C. 154(b) by 154 days.

(21) Appl. No.: 18/491,691

(22) Filed: Oct. 20, 2023

(65) Prior Publication Data

US 2025/0132712 A1   Apr. 24, 2025

(51) Int. Cl.
| | |
|---|---|
| B60W 50/16 | (2020.01) |
| G06F 3/01 | (2006.01) |
| H02P 23/14 | (2006.01) |

(52) U.S. Cl.
CPC .............. *H02P 23/14* (2013.01); *G06F 3/016* (2013.01)

(58) Field of Classification Search
CPC ................................ G06F 3/016; H02P 23/14
USPC ......................................................... 318/466
See application file for complete search history.

(56) References Cited

U.S. PATENT DOCUMENTS

| | | | |
|---|---|---|---|
| 9,673,684 B2 | 6/2017 | Shaw | |
| 9,673,688 B2 | 6/2017 | Shaw | |
| 9,800,109 B2 | 10/2017 | Shaw | |
| 9,859,763 B2 | 1/2018 | Shaw | |
| 10,170,953 B2 | 1/2019 | Shaw | |
| 10,211,694 B1 | 2/2019 | Shaw | |
| 10,256,690 B2 | 4/2019 | Shaw | |
| 11,001,201 B2* | 5/2021 | Weston | ................... B60K 20/04 |
| 11,005,322 B2 | 5/2021 | Milheim et al. | |
| 11,121,614 B2 | 9/2021 | Milheim | |
| 11,336,130 B1 | 5/2022 | Shaw et al. | |
| 11,527,933 B2 | 12/2022 | Shaw et al. | |
| 11,855,484 B2 | 12/2023 | Milheim et al. | |
| 2004/0184798 A1 | 9/2004 | Dumm | |
| 2007/0053681 A1 | 3/2007 | Arbuckle | |
| 2010/0128122 A1 | 5/2010 | Wright | |
| 2011/0102145 A1* | 5/2011 | Park | ........................ G06F 3/016 340/6.1 |
| 2014/0216023 A1 | 8/2014 | Rabhi | |
| 2014/0218603 A1 | 8/2014 | Stone | |
| 2014/0315642 A1* | 10/2014 | Grant | .................... A63F 13/285 345/184 |
| 2015/0084446 A1 | 3/2015 | Atar | |
| 2017/0241589 A1 | 8/2017 | Wang et al. | |
| 2017/0363932 A1 | 12/2017 | Lim et al. | |

(Continued)

FOREIGN PATENT DOCUMENTS

WO     2018157591 A1    9/2018

*Primary Examiner* — Gabriel Agared
(74) *Attorney, Agent, or Firm* — Sean Lynch (57) ABSTRACT

Systems and methods of the inventive subject matter are directed to haptic feedback systems that use PCB stator motors in at least the input subsystems. Systems thus include one or more input subsystems that are configured to operate with an output subsystem (either real or virtual). Input subsystems implement PCB stator motors to eliminate cogging and to create high-fidelity, ultra-realistic haptic feedback that a user would be unable to distinguish from direct operation of a similar mechanical system. In some embodiments, multiple input subsystems are configured to operate with a single output subsystem.

12 Claims, 7 Drawing Sheets

(56) References Cited

U.S. PATENT DOCUMENTS

| | | |
|---|---|---|
| 2018/0018020 A1* | 1/2018 | Grant .................... G06F 3/0338 |
| 2018/0283601 A1 | 10/2018 | Wei |
| 2019/0063668 A1 | 2/2019 | Wei |
| 2019/0074747 A1 | 3/2019 | Shukla et al. |
| 2020/0014316 A1 | 1/2020 | Hobbs |
| 2020/0116195 A1 | 4/2020 | Chen et al. |
| 2020/0145577 A1 | 5/2020 | Enke et al. |
| 2021/0064136 A1* | 3/2021 | Chassot ................ A63F 13/285 |
| 2021/0135549 A1 | 5/2021 | Lee et al. |
| 2021/0218304 A1 | 7/2021 | Schuler et al. |
| 2021/0229738 A1* | 7/2021 | Kotula ................... B62D 6/008 |
| 2021/0387580 A1 | 12/2021 | Canones Bonham |
| 2023/0216363 A1* | 7/2023 | Hobbs ................ H02K 11/0094 |
| | | 310/67 R |

* cited by examiner

CONTROL SYSTEMS AND METHODS WITH HAPTIC FEEDBACK

FIELD OF THE INVENTION

The field of the invention is control systems featuring haptic feedback.

BACKGROUND

The background description includes information that may be useful in understanding the present invention. It is not an admission that any of the information provided in this application is prior art or relevant to the presently claimed invention, or that any publication specifically or implicitly referenced is prior art.

Mechanical control systems—systems where a human operator provides a physical input to control a mechanical system—are known for a few qualities, most important of which in many cases is that mechanical control systems provide physical feedback to the human operator. In a mechanical control system for an airplane, when a pilot pulls back on the yoke, the pilot can feel the wind, resistance, and weight of the entire mechanical system. The physical experience of pulling back on a yoke while flying an aircraft involves the transmission of mechanical energy from the rear of the aircraft to the yoke of every perturbation, change in wind speed, the resistance to change in position of the elevators caused by wind, and so on.

The same is true for hydraulic systems. When an equipment operator pulls a lever to lift a load of dirt using an excavator, the weight of that load can be felt by the operator through the lever. Forces resisting movements of the excavator (e.g., the weight of the load) requires additional hydraulic force to be applied, which is mechanically translated to the operator's hands at the levers of the excavator. Mechanical feedback of this nature allows operators to operate heavy, hydraulically driven equipment more accurately and precisely.

In television and film, camera operators similarly rely on the weight and inertia of mechanical systems to create smooth, controlled movements of a camera they control. For example, to smoothly pan or tilt a camera, camera operators rely on the weight of a system to resist input forces such that rotating a pan wheel occurs smoothly.

But mechanical systems have limitations. To transmit mechanical energy from one location to another, there must exist some kind of mechanical connection between a user input and the mechanical output. In aircraft, that can be a one or more wires or hydraulic lines. In heavy equipment, that is often hydraulic lines. Mechanical connections can include shafts, chains, belts, linkages, and so on, all of which introduce parts that can fail.

This gives rise to a need for "fly-by-wire" type systems. In a fly-by-wire system, mechanical input is received at an input subsystem, converted into an electrical signal, and then transmitted to an output subsystem. But by eliminating a mechanical connection between the input and output, the "feel" of the mechanical system is also eliminated. That gives rise to the need for electronically generated haptic feedback, which can be created by, e.g., using an input motor that receives information from an output motor to provide a user with the simulated feel of a mechanical system.

Once again, though, limitations exist that make many fly-by-wire systems inferior to their mechanical counterparts. For example, typical motors can experience cogging torque due to interactions between the permanent magnets of the rotor and the stator slots in the motor. Cogging torque can significantly degrade the quality of haptic feedback a user can experience on both ends of a system—the overall resolution of a typical motor's angular position is low due to the number of permanent magnets and how they interact with the stator, and those motors exist in both an input subsystem and an output subsystem. Limitations in haptic feedback, in many cases, make systems built with typical direct current motors inferior to their mechanical counterparts.

Thus, there is exists a need for fly-by-wire electronic systems that feature higher haptic resolution. To do this, these systems must use improved motors that offer higher positional resolution.

Although the term "fly-by-wire" is typically associated with aviation, this application uses the term broadly to refer to analogous systems in other use cases and contexts (e.g., automotive, nautical, equipment operation, camera operation, and so on).

SUMMARY OF THE INVENTION

The present invention provides apparatuses, systems, and methods directed to haptic feedback control systems that use PCB stator motors. In one aspect of the inventive subject matter, a haptic feedback control system comprises: an input subsystem having an input PCB stator motor, an input motor controller, and an input motor encoder; an output subsystem having an output motor, an output motor controller, and an output motor encoder; where the input motor controller is configured to detect an input torque applied to the input PCB stator motor; where user input comprising the input torque is transmitted from the input subsystem to the output subsystem; where the output motor is configured to generate output torque according to the user input; where the output motor encoder is configured to detect an output motor angular position; where output motor position information comprising the output motor angular position is transmitted from the output subsystem to the input subsystem; where a target position for the input PCB stator motor is updated based on the output motor position information; and where haptic feedback is generated in the input PCB stator motor according to an offset of the input PCB stator motor from the target position resulting from the input torque.

In some embodiments, the output motor comprises a PCB stator. The target position for the input motor, in some embodiments, is a function of the output motor angular position. The input subsystem and the output subsystem are configured to communicate via a comms layer (e.g., wired or wirelessly), and the comms layer can include a control computer configured to change the user input and the output motor position information.

In another aspect of the inventive subject matter, a haptic feedback control system comprises: an input subsystem comprising an input PCB stator motor; an output subsystem comprising an output motor; where the input motor subsystem is configured to detect a user input to the input PCB stator motor; where user input is transmitted from the input subsystem to the output subsystem; where the output motor is configured to generate an output torque according to the user input; and where the input PCB stator motor is configured to generate haptic feedback based on an angular position of the output motor resulting from applying the output torque to the output motor.

In some embodiments, the user input comprises torque information. The haptic feedback can be based on a target position of the input PCB stator motor, where the target position is assigned based on the angular position of the output motor after applying the output torque.

In another aspect of the inventive subject matter, a haptic feedback control system comprises: a first input subsystem comprising a first input PCB stator motor; a second input subsystem comprising a second input PCB stator motor; an output subsystem comprising an output motor; where the first input motor subsystem is configured to detect a first user input to the first input PCB stator motor; where the second input motor subsystem is configured to detect a second user input to the second input PCB stator motor; where a combined user input comprising the first user input and the second user input is transmitted from the first input subsystem and the second input subsystem to the output subsystem; where the output motor is configured to generate an output torque according to the combined user input; where the first input PCB stator motor is configured to generate a first haptic feedback based on a position of the output motor resulting from applying the output torque to the output motor; and where the first input PCB stator motor is configured to generate a first haptic feedback based on a position of the output motor resulting from applying the output torque to the output motor.

In some embodiments, the combined user input comprises torque information, and the torque information can be a combination of first user input and second user input. In some embodiments, the first haptic feedback is based on a first angular position of the first input PCB stator motor compared to a first target position of the first input PCB stator motor, and where the second haptic feedback is based on a second angular position of the second input PCB stator motor compared to a second target position of the second input PCB stator motor. In some embodiments, the first target position and the second target position are based on the position of the output motor resulting from applying the output torque to the output motor.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, numbers expressing numerical ranges used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer, computing device, micro controller, controller, and so forth, should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Systems and methods of the inventive subject matter are directed to fly-by-wire systems. Generally speaking, fly-by-wire systems of the inventive subject matter feature one or more input subsystems that receive an input (e.g., human input), convert that input into a digital signal, and transmit that signal to an output subsystem. Once received at an output subsystem, the output subsystem convers the signal into a physical output (e.g., it causes an output motor to turn). Different embodiments can include more features or fewer features, depending on the requirements of each embodiment.

Generally speaking, systems and methods of the inventive subject matter feature one or multiple inputs that modify one output. In other words, multiple inputs can modify one output position. Inputs are generally created by human operators (e.g., in the form of some force applied to a system's input), and as a result of an input applied to an input motor, an output motor changes its angular position. In some embodiments, only one input modifies an output, while in other embodiments, multiple inputs affect a single output (and in turn affect each other). By using electric motors, information relating to input motors and an output motor (e.g., input forces and resistance to output motor movements) can be transmitted between locations that are not mechanically coupled—e.g., via wired or wireless connection—in such a way that mimics mechanical coupling.

When an input motor attempts to move according to the position of an output motor, the input motor can meet opposing forces (e.g., forces that oppose movement of the input motor, such as a force applied by a user). When forces opposing input motor movements are encountered, those forces are interpreted as inputs (e.g., a user pulling a lever or turning a wheel that is coupled with an input motor). Input forces can result in changes to input motor angular position, which can in turn result in changes to output motor angular position. User inputs are described in more detail below.

Because systems of the inventive subject matter operate by transmission of electrical signals between input control loops and output control loops, some systems can feature virtualized or emulated outputs. For example, virtual and augmented reality systems may allow a user to provide mechanical input to a system to control a virtual output, such as a virtual car or virtual aircraft. Such systems can be useful in situations where it is beneficial to train people outside of the pressures of a real-life situation, while still giving those people the haptic experience of actual operation. Embodiments featuring virtual outputs may also be useful for video game inputs in, e.g., racing games or flight simulator games, where a system of the inventive subject matter can be programmed to imitate any kind of vehicle's steering characteristics or flight characteristics.

Figure 1:
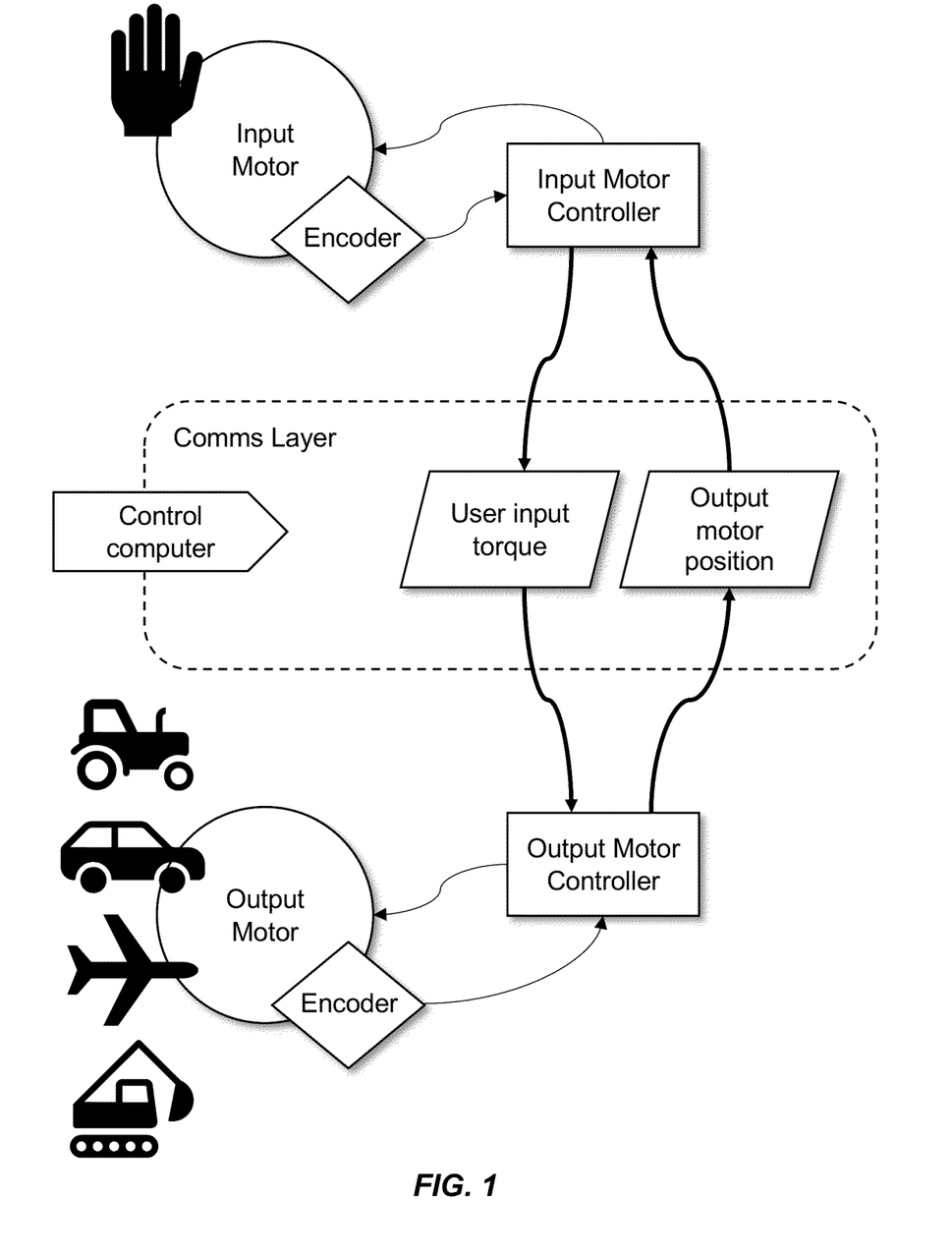
FIG. 1 is a schematic of a haptic feedback system having an input subsystem and an output subsystem.

FIG. 1 schematically describes a system of the inventive subject matter that features an input subsystem and an output subsystem that are connected by a comms layer. The input subsystem is configured to receive user input. User input ultimately causes rotation in an input motor. When a user applies sufficient force to an input motor, that user's input gives rise to a change in angular position of an input motor. User input can arise, for example, by a user rotating a wheel, pulling a lever, or otherwise applying some force to an input mechanism that is coupled with the input motor (or by applying force to an input motor directly, in some embodiments). Input mechanisms that are coupled with input motors can allow users to provide input in a variety of different ways (e.g., via lever, wheel, linearly, and so on), depending on the configuration of the input mechanism and based on a desired user experience.

The system shown in FIG. 1 thus shows an input subsystem comprising an input motor, an encoder, and an input motor controller. Typical electric motors are generally inappropriate for embodiments of the inventive subject matter. For example, ordinary motors (such as DC motors having traditional stators) are inappropriate for embodiments described in this application because they do not provide sufficiently high angular position resolution and because cogging can ruin the haptic feedback user experience. Because of the way DC motors having traditional stators are constructed, cogging torque resulting from stator configuration causes output torque of the motor to ripple. This rippling effect is undesirable for systems that create haptic feedback, and especially in sensitive systems where the feel of how a system moves according to user input is paramount to effective use of that system. When cogging in traditional DC motors occurs, a human operator can easily perceive that rippling, which can impact precise movements or otherwise negatively impact user experience. In addition to these drawbacks, traditional DC motors are also expensive and can be difficult to assemble.

Thus, for systems of the inventive subject matter to give haptic feedback to a user that feels believable according to what is being controlled by an output motor, a certain level of fidelity must be achieved. Reaching requisite levels of fidelity to create a haptically believable system is where cogging created by ordinary DC motors causes issues, and that cogging effect makes motors that do not feature PCB stators inappropriate as input motors in embodiments of the inventive subject matter.

Cogging presents a range of problems. With cogging, a motor's torque response is different at different speeds and angular positions. This creates undesirable movement and torque variability that a user would perceive, thereby negatively impacting the user experience. While it is possible to account for cogging via filtering and other processing, accounting for cogging leads to coarse filtering, and thus a coarse feeling for a user. Although it is possible to reduce the impact on user experience by using smaller motors that give rise to less cogging, smaller motors still have cogging issues and are also inappropriate for larger systems that require higher torque to adequately create a believable haptic experience in systems that require higher input resistance.

Systems of the inventive subject matter solve this issue by implementing input motors having PCB stators. PCB stator motors are capable of scaling up extremely high to function in systems that require high input and output forces, because PCB stator motors can be created to produce high torque without giving rise to perceptible cogging.

Motors featuring PCB stators do not give rise to human perceptible cogging and can be easily manufactured and assembled, because primary components, such as wire windings, are printed onto a circuit board instead of needing wires that are physically wound to create electromagnets. PCB stator motors are essentially low-cost coreless motors, unlike traditional DC motors that have iron cores (components that contribute to the cogging effect described above). Additionally, because PCB stators implement windings as, e.g., copper traces on printed circuit boards instead of physically wound wiring on iron cores, PCB stators are capable of including changes in width along the length of a traced winding-a feature that is impractical and, in many cases, impossible to implement in traditional DC motors.

Thus, at a minimum, input motors implemented into embodiments of the inventive subject matter must be PCB stator motors. Advantages conferred by using PCB stator motors cannot be achieved by ordinary DC motors, making other motor types inappropriate on the input side. PCB stator motors can be configured in a variety of ways without deviating from the inventive subject matter. In many embodiments, output motors are also PCB stator motors, though because typically a human operator is not physically interacting with an output motor, PCB stator motors may not be necessary. In embodiments where human input can be provided to either the input or output side (to use the vocabulary of this application), PCB stator motors would be needed on both sides.

According to FIG. 1, when a user applies a force to an input motor sufficient to cause rotation, the rotation of the input motor is measured by, e.g., a rotary encoder. A rotary encoder is a sensor that can detect position and speed by converting rotational mechanical displacement into encoded electrical signals. Information from the rotary encoder can then be sent to an input motor controller. The input motor controller is configured to coordinate with the output motor controller via comms layer. As used in this application, the comms layer can refer to a connection between an input subsystem and an output subsystem (e.g., wired or wireless). In some embodiments, the comms layer is strictly a network connection between the two subsystems, while in some embodiments, a control computer can be implemented to process signals passing between the two subsystems.

For example, in a system where a pilot pulls back on a yoke that is coupled with an input motor in an input subsystem of the inventive subject matter, the input motor controller attempts to hold the yoke stationary and the pilot applies an input force to the yoke to overcome the holding torque. User input in the form of a measurement of torque is detected and processed by the input controller. By applying some force, the user also causes the input motor to rotate, creating an offset between a target angular position for the input motor and its actual angular position. The input controller tries to maintain the original position of the yoke (i.e., the target position) by applying a counteracting torque, and the force the user imparts on the yoke is thus detected by inverting the torque the input motor controller generates to try to maintain the yoke's original position that corresponds to the target position of the input motor. This processing and updating is performed at high speed within the input motor controller. In some embodiments, a sufficiently high speed is greater than 100 Hz.

In some embodiments, good haptic feedback results can be experienced when processing and updating (e.g., transmissions of user input information and of output motor position information) can occur around or greater than 100 Hz. A good haptic feedback result is one in which a user experiences the haptic feedback minimal or imperceptible latency or with minimal or imperceptible system-originated vibrations (e.g., unintended vibrations that result from the configuration or software control of the system rather than as the result of actual haptic feedback).

As described in this application, embodiments of the inventive subject matter can be configured such that a user's input can result in haptic feedback that is not directly a result of the resistance forces encountered by the output motor. For example, if the output motor is configured to manipulate a low-weight object, then the input motor can be configured to create a haptic experience that would exist for a heavy object, instead. This can be accomplished, e.g., by a control computer in the comms layer, by an input motor controller, and so on.

Additionally, output motors of the inventive subject matter can be allowed to move according to permissible acceleration characteristics. In some instances, a user may provide input that could cause harm or breakage to output components, and thus the output motor may generate torque according to that user input that is subject to, e.g., an acceleration curve. Such an acceleration curve can be implemented by the output motor controller.

Embodiments of the inventive subject matter can thus operate in a way that smooths out jerky movements and give rise to smooth output motor movements. Smooth movements are the result of smooth acceleration curves (e.g., Bezier curves), and acceleration curves can be compressed or otherwise modified. Thus, impacts or other external forces (such as a cable causing resistance to the output motor) may not necessarily show up in a given system's haptic feedback if the system's output motor acceleration characteristics do not allow the output motor to experience tiny perturbations in acceleration that are the result of resistance or friction forces.

Thus, in such a system, a user on an input side would not feel imperfections in a bearing via haptic feedback, but they would experience the feeling of, e.g., a camera head rotating into a surface or object that arrests its movement. By having systems of the inventive subject matter focus on transmitting user input in the form of torque information only when input torque is experienced and then transmitting output motor angular position information only when a change in angular position is experienced, network traffic can be minimized. In some embodiments, an output motor's position—if completely unloaded and without encountering any resistance or friction forces—could be known by mathematical relationship to the applied torque. Thus, to further reduce network traffic, angular position information of the output motor can be transmitted only when the output motor's position does not match an expected position.

By minimizing network traffic in this way, user input information and output motor position information can be transmitted only when necessary, resulting in variable update rates that, in some cases, can fall below 100 Hz (e.g., when no torque is input by a user and no output motor movement occurs). In cases where movement occurs, update rates of 100 Hz or higher are generally sufficient to create believable haptic feedback.

In embodiments featuring a control computer, the control computer can make additional changes to input information transmitted by the input motor controller. For example, the input motor controller can transmit input information corresponding to a user's mechanical inputs (e.g., torque information) but in some systems, the user's inputs can be modified to improve efficiency or to maintain a desired operating characteristic. In cases of aircraft, for example, a wide array of sensors responsible for maintaining flight characteristics may be processed by onboard computers and necessitate changes to a user's input before the information about the user's input reaches the output motor controller. Especially in the case of flight, the control computer may understand that to bring about a desired output, the user's input may need to be adjusted based on current wind conditions, air speed, temperature, pressure, flight characteristics of the aircraft, and so on. Thus, the pilot's inputs may be changed or adjusted by the control computer to bring about a movement of the aircraft that the pilot expects based on the provided input.

Control computers can be introduced in contexts outside of flight, as well. For example, in the case of a car, a driver's steering input may need to be adjusted according to a traction control system's sensor readings to bring about the behavior that the driver intends, even if the driver's input must be changed or adjusted (if even slightly) to create that effect. In another example, a control computer can be configured to disallow inputs that could cause system damage or otherwise lead to failure. For example, if a pilot provides an input that, given current flight characteristics, could risk structural integrity of an aircraft, the control computer could adjust the pilot's input to an acceptable range.

Next, the output motor controller receives input information from the input motor controller (with or without modification by the control computer). Using that input information, the output motor controller causes the output motor to generate a torque. User input information from the input motor controller comprises a measure of torque applied to the input motor by a user, thus indicating how hard a user has applied force to an input mechanism coupled with the input motor. Torque generated by the output motor is therefore a function of torque input by the user. In some embodiments, input information is scaled by some factor. Scaling can be linear (e.g., multiplicative), though in some embodiments scaling can be conducted according to any mathematic function. In some embodiments, scaling can be adjusted dynamically and according to information received by the control computer from other sensors or systems outside of the input and output subsystems.

Thus, the output motor controller causes the output motor to rotate by generating torque based on the user input received from the input motor controller. The output motor, like the input motor, includes a rotary encoder to measure rotation information of the output motor. Electrical signals from the output encoder are sent to the output motor controller to determine position offsets of the output motor caused by forces applied by the output motor according to the user input. When a user input results in output motor torque high enough to overcome any resistance forces the output motor encounters, the output motor will rotate from its initial position to a new position. The new position of the output motor is determined by the output motor encoder and sent from the output motor controller to the input motor controller (subject to modification in the comms layer). The new position of the output motor is thus used to set a new target position for the input motor. By updating the target position of the input motor according to a movement of the output motor, the torque applied by the input motor changes on the fly according to the offset between the actual position of the input motor and the offset position of the input motor.

In addition to transmitting torque information from input motor controllers to output motor controllers and position information from output motor controllers to input motor controllers, comms layers of the inventive subject matter can be used to for error correction. Error correction can involve periodically checking that a position of the input motor matches a position of an output motor by passing output motor position information to the input motor controller. For this type of error correction to work, time information such as a timestamp associated with output motor position information can be passed as well. In some embodiments, the last received packet ID from the output motor controller can also be used for error correction.

Packet IDs can be used in error correction to generate a time stamp (albeit a loose timestamp, in some situations). Packet IDs can be incremented numerically based on a number of packets transmitted. In embodiments where packets are sent at predictable times, packet IDs can be used to infer a time that a packet was sent. Packet IDs can also enable determining packet loss as well as packet order.

The output motor controller can also be configured to monitor output motor movements and perturbations because the output motor controller has the highest frequency relationship with the output motor. Thus, monitoring systems can be implemented within the output motor controller that take advantage of this high frequency relationship. For example, while the comms layer may achieve 100-1000 Hz rates, the output motor controller can have 8-24 kHz access to, e.g., encoder or torque information from the output motor. Thus, if a system needs to, for example, plot a deceleration curve in case of an error, the output motor controller is best positioned to make that the deceleration curve.

In general, it can be beneficial for systems of the inventive subject matter to define and monitor real time circumstances and constraints on the output motor side because output motor positioning and resistance forces experienced by the output motor are the most important aspects to account for in the various control loops. Thus, output information (which may be scaled according to scaling applied to input information) is transmitted via the comms layer (e.g., by wired or wireless connection) to the input motor controller at extremely low latency (e.g., 100 Hz). Latency needs can depend on system implementation and design needs. For example, in systems with heavy loads and high intertia on the output motor, 100 Hz and sometimes even less is enough. In systems with light loads and fast movement speeds, higher rates (i.e., lower latency) can be needed (e.g., 100 Hz or higher). Once the input motor controller receives output information from the output motor controller, the input motor controller causes the input motor's position to change according to the output information. Thus, the input motor's target angular position is linked to the output motor's actual angular position (e.g., either linearly or according to some scaling function or relationship as described above) where an offset from the target position is arrived at according to an amount of torque applied to the input motor and according to how much resistance the output motor encounters, such as wind resistance, friction resistance, and so on.

By coupling torque acting on an input motor with movements of the output motor at sufficiently fast enough refresh rates, a user applying an input force to a system can experience a seamless haptic feedback based on movements of the output motor as if the input and output are physically linked. For example, if a pilot presses forward on an aircraft's yoke, wind resistance opposing a change in the position of the aircraft's elevator is transmitted back to the input motor in the form of change of angular position information, which causes the input motor to give the pilot a tactile sense of how the plane responds to their inputs. With increased resistance to movement at an output motor, an input motor generates increased torque to resist a user's input.

The schematic shown in FIG. 1 is an example of a system having one degree of freedom. One input motor is tied to one output motor. This may apply to certain types of systems like a car's steering. But many systems require multiple degrees of freedom to control. For example, although a pilot may pull back or push forward on a yoke, that yoke also has a steering wheel that can control ailerons, giving a pilot control over pitch and roll. Thus, multiple systems described in FIG. 1 can be used in coordination with each other to give rise to multiple degree of freedom systems. Information from a first system of the inventive subject matter can be used by a second system of the inventive subject matter, e.g., via the second system's control computer, and vice versa.

It should be understood that, in some embodiments, the output subsystem can also act as an input subsystem, giving rise to bi-directional systems with human users on both sides. This can be advantageous, for example, where a remote camera operator works in tandem with a camera operator that directly manipulates a camera head that the remote operator provides inputs to from their controls. In some embodiments, the output subsystem does not act as an input subsystem and instead user input on the output side is encountered as resistance to movement that results in updating an output motor's angular position.

Figure 2:
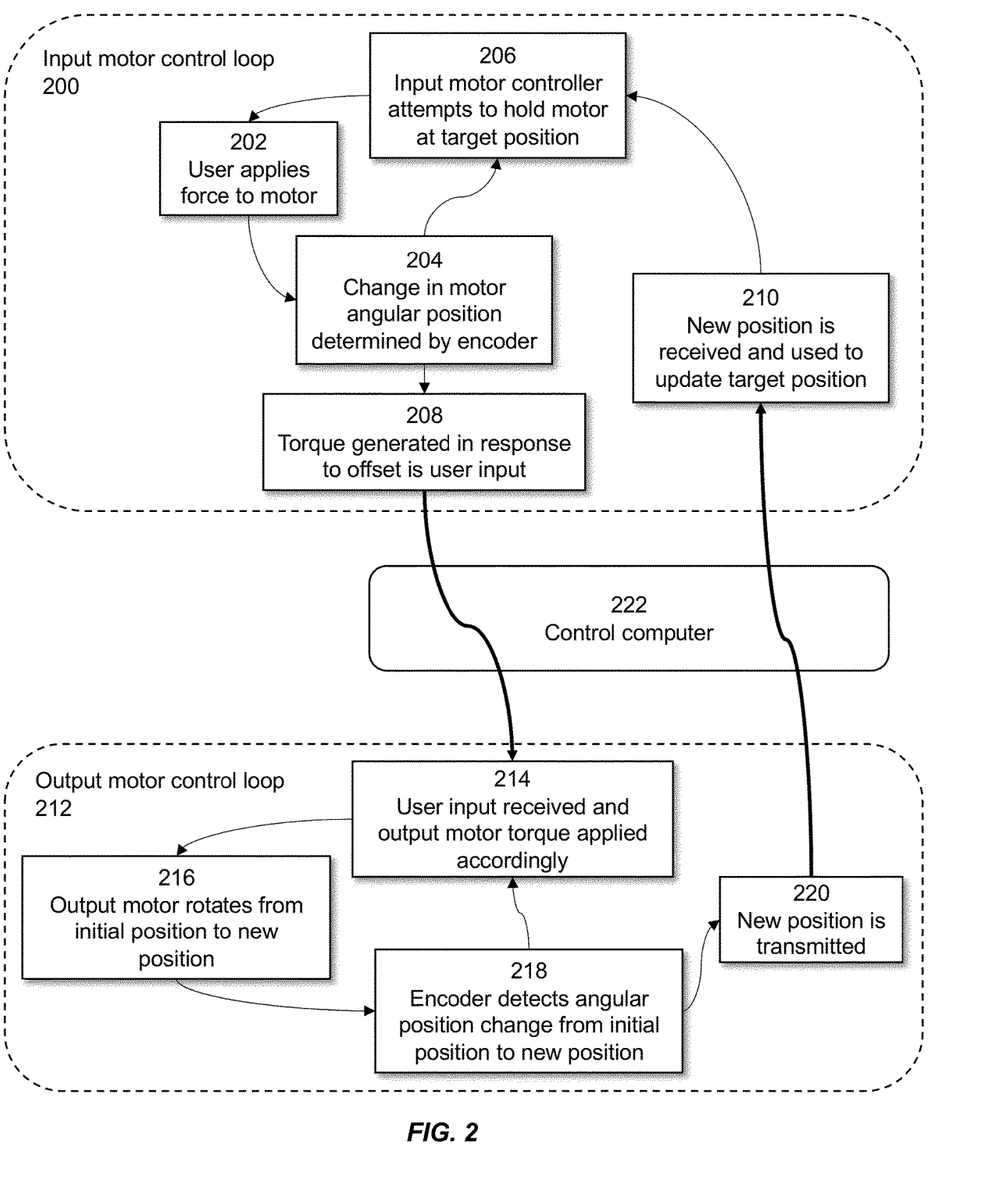
FIG. 2 is a flowchart describing interactions between an input motor control loop and output motor control loop.

FIG. 2 is a flowchart showing a control system for an embodiment of the inventive subject matter shown in FIG. 1. The system includes an input motor control loop and an output motor control loop. The system is also modeled with a control computer between the two, though the control computer is optional.

The input motor control loop 200 features a loop having three primary steps. Other steps can be introduced without deviating from the inventive subject matter. In step 202, a user applies force to a motor. This step describes user input, such as a pilot moving a yoke, a driver turning a wheel, an equipment operator pulling on a lever, and so on. When enough force (e.g., torque) is applied to an input motor, the input motor's angular position changes, and that angular position change is recorded by an encoder coupled with the input motor according to step 204. A change in angular position can be described as an offset from an initial position, and an amount of torque generated by the input motor to bring the motor back to its target position from its offset position is considered the user's input in step 208. The act of the input motor generating torque to hold itself at the target position once an offset is created is described in step 206.

A user's input as transmitted between subsystems or components that are included in systems of the inventive subject matter thus comprises torque information. In some embodiments, such as the one described in FIG. 1, when a user applies a force to an input motor, an offset is created between the input motor's actual position and its target position. The system's response to this offset it to generate input motor torque to move the input motor back to the target position. The amount of torque applied to the input motor is thus proportional to a user's physical input to the system (e.g., the harder a user pulls a lever, the greater the offset between the target position and the actual position of the input motor, the greater the torque the input motor must generate to push against that lever to resist the pull). Thus, the magnitude of the torque resisting the user's input is based on the offset between the input motor's actual position and its target position, which is in turn a function of how much an output motor moves in response to a user's input to the system.

An input motor subsystem that is perfectly balanced, such that the motor's position does not change in the absence of external forces, even if the input motor is turned off, can cleanly measure a user's input as torque. In such a system, any measured torque generated by an input motor controller to keep the input motor's angular position at the target position can thus be considered as pure user input (e.g., user input without any other forces acting in tandem). An example of such a system is one in which the input mechanism to the system is a balanced wheel. Because wheels are balanced, and because no current to the input motor means there is no motor movement, any requirement by the input motor to increase holding torque can be considered user input into the system. The user's input can be measured using high resolution 32-bit floating point data. In other words, the input motor acts as a high-resolution torque sensor, where the measured torque is the user's input to the system.

In unbalanced systems, however, an input motor at rest may not remain stationary when the system is at rest. For example, if a system's input is a lever arm coupled with the input motor, then in some positions, gravity acting on the lever may pull on the lever, applying some amount of torque to the input motor. In unbalanced systems, holding torques can be digitally mapped into the system such that the system knows how much torque to apply to hold an input motor stationary in the absence of user input at all possible input motor angular positions. Such maps are referred to as "input holding maps" in this application.

In some embodiments, systems can include a filter that can be applied to the detected user input. A filter can be used to remove errant inputs that were not human originated or did not otherwise reach a required threshold for input torque. Because PCB stator motors used in systems of the inventive subject matter are capable of detecting even very small movements or forces, inputs that fall below a certain level can be excluded to eliminate noise. For example, if wind hits an input lever, it could apply a very small amount of torque to that lever. In such an instance, the input motor could resist that movement by applying a counteracting torque without passing that input information to the output subsystem. The threshold input level for each individual system can be different and can be adjusted either automatically or manually based on a desired input threshold and depending on the needs of a particular system. For example, a system implemented for camera control may have a very low threshold because camera control systems feature balanced input mechanisms (e.g., handwheels) and high sensitivity is beneficial to allow a camera operator to make fine camera movements. In other systems, like a lever to operate construction equipment for example, it is advantageous to avoid accidental movements (like accidentally manipulating an excavator), and thus such a system may have a higher threshold for input forces to ensure any inputs passed to the output side of the system are deliberate and originated from a human user instead of vibration from an engine or some other external factor. This can be conceptualized as digitally adjustable coefficient of static friction, which results in higher input forces required to overcome static friction. In this instance, the force is external input torque and static friction is the threshold of external torque which is sufficient to be considered input.

Once an input holding map is developed for a system, user input into a system can be determined by detecting how much torque is applied to the system beyond the expected holding torque at each angular position in the input holding map. That excess torque is thus considered the result of human input into the system, and assuming that input exceeds a threshold (if the system implements input filtering), then the user input is passed to the output subsystem from the input subsystem, subject to processing, scaling, or any other changes necessary for that particular system.

Torque applied to the input motor is thus generated by the input motor controller based on an offset of the input motor from a target position. During step 206 while the input motor is attempting to hold at the target position, the input motor controller receives updated angular position information of the output motor according to step 210. An updated output motor angular position received in step 210 is used to update the input motor's target position. For example, if the output motor moves 2 degrees from angular position A to angular position B, then the input motor may set a new target position corresponding to angular position B (though the degrees change from A to B as applied to the input motor may be different depending on differences in movement between the input motor and the output motor, such as scaling or other applied changes). The input motor driver thus, according to step 206, attempts to hold the input motor at the updated target position received in step 210. To do this, the input motor controller causes the input motor to generate torque to move the input motor from its offset position to its target position, where the magnitude of that torque is based on forces applied by the user (and is ultimately a function of the amount of resistance torque the output motor encounters as it moves). If the user input overcome the holding forces determined by the output motor control loop, then the output motor rotates, and a new target position is defined, and the user's input is transmitted from the input motor control loop to the output motor control loop via control computer 222 to cause the output motor to apply a torque and thus change positions, resulting in an updated target position, and so on.

Output motor control loop 212 features a number of steps that focus more on angular position. After the input motor receives a user input and the user input is transmitted to the output motor control loop according to step 208, the output motor generates torque according to the user input in step 214. Applying torque causes the output motor to rotate from an initial position to a new position according to step 216. Per step 218, the output motor's encoder measures angular position and thus records the new angular position of the output motor. Next, in step 220, the new position of the output motor is transmitted (e.g., via the control computer) to the input motor control loop 200.

By configuring the system in this way, a user's inputs can both translate to movement of an output motor while also allowing the user to experience haptic feedback according to resistances met by the output motor. Resistances can be caused by a variety of factors, including inertia, friction forces, aerodynamic forces, and so on. Because motors of the inventive subject matter comprise PCB stators, haptic feedback experienced by a user accurately reflects resistances met by an output motor without any tactilely detectable artificial movements (e.g., cogging).

Figure 3:
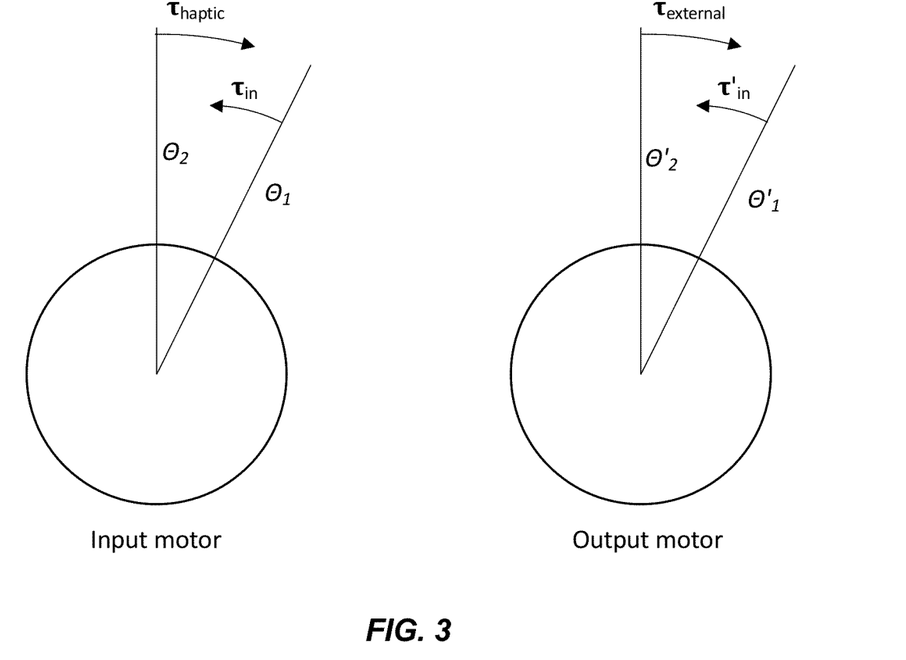
FIG. 3 shows how torques and angular positions are related between an input motor and an output motor.

FIG. 3 shows this process in the context of an input and output motor, showing how torque and position are used to create the control systems described in this application. The left side of the Figure is the input side, and the right side of the Figure is the output side. For the input side: $\Theta_1$ is the target angular position of input motor; $\Theta_2$ is the angular position of input motor created by applying user input in the form of torque; $\Theta_2$ minus $\Theta_1$ yields an offset; $\tau_{in}$ is the torque applied by a user to bring the input motor to $\Theta_2$; $\tau_{haptic}$ is the torque applied by the input motor to resist $\tau_{in}$; and $\tau_{haptic}$ opposes $\tau_{in}$ such that movement occurs when $\tau_{in}$ is greater than $\tau_{haptic}$.

For the output side: $\Theta'_1$=initial angular position of output motor; $\Theta'_2$ is the angular position of input motor created by applying $\tau'_{in}$; $\Theta_1$ is a function of $\Theta'_2$, such that $\Theta_1$ changes as $\Theta'_2$ changes; $\tau'_{in}$ is torque generated by the output motor and is a function of $\tau_{in}$; as an emergent behavior of the system, $\tau_{haptic}$ is a function of $\tau_{external}$; $\tau_{external}$ is a function of $\tau'_{in}$ (e.g., the system measures friction by how much torque the output motor must generate to change positions); and $\tau_{external}$ opposes $\tau'_{in}$ such that movement occurs when $\tau'_{in}$ is greater than $\tau_{external}$.

When a user applies $\tau_{in}$ torque, an offset is created between $\Theta_1$ (the target position of the input motor) and $\Theta_2$ (the new position after the user applies $\tau_{in}$). When this offset exists, the input motor tries to bring itself back to the target position by applying torque. In response to the user applying $\tau_{in}$ torque, the output motor applies $\tau'_{in}$ torque. If the output motor does not rotate, because $\tau'_{in}$ is insufficient to overcome $\tau_{external}$, then output motor's position does not change. If the output motor's position does not change, then the target position of the input motor is never updated, and the input motor will continue to apply torque to return to the original target position. But if $\tau'_{in}$ IS sufficient to overcome external torque forces, the output motor will rotate from $\Theta'_1$ to $\Theta'_2$ and $\Theta_1$ will update as a function of $\Theta'_2$. Thus, when movement of the output motor occurs, $\tau_{haptic}$ is a function of the magnitude of torque $\tau'_{in}$, and therefore $\tau_{haptic}$ emerges based on user input torque applied to the input motor combined with a constantly updating target position as set according to the position of the output motor. If a user pushes harder and harder and the target position remains unchanged, the emergent $\tau_{haptic}$ is a result of the input motor trying harder and harder to hold the target position to eliminate the offset.

Figure 4:
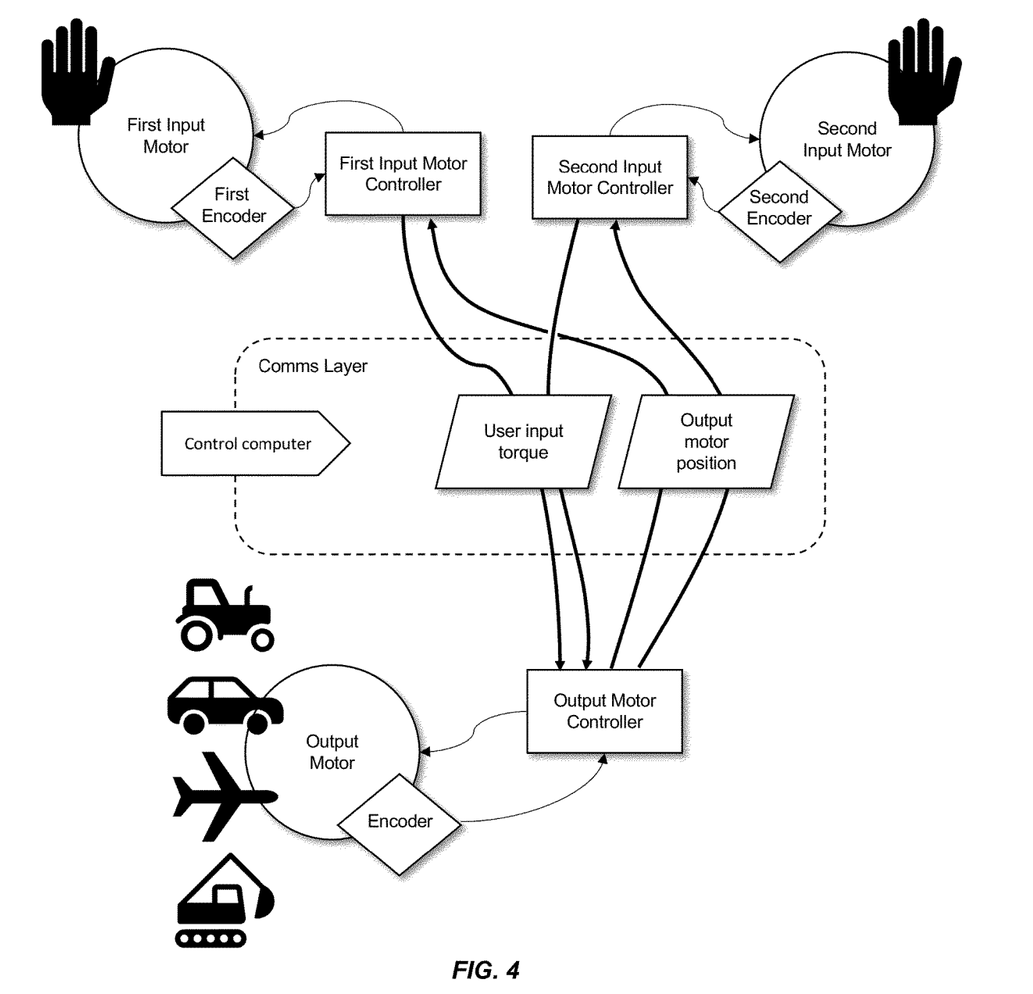
FIG. 4 is a schematic of a haptic feedback system having two input subsystems and one output subsystem.

FIG. 4 describes another embodiment of the inventive subject having two input control subsystems that provide input to a single output control subsystem. Thus, two users can each apply inputs to two separate input subsystems to control a single output subsystem. The system shown in FIG. 4 features a first input motor having a first input motor controller and a first encoder. The second input motor has a second input motor controller and a second encoder. To keep both the first motor and the second motor operating in tandem, resistances to movements of both input motors are affected by movements of the output motor.

For example, if a first user pulls on a lever that is coupled with the first input motor, the first encoder measures an offset and the first input motor applies a torque to bring the motor back to its target position. That torque is interpreted as the user's input. The first motor controller sends first user input information to the output motor controller via the comms layer. In some embodiments, scaling or other adjustments to the information can be applied as described above during the comms layer. For example, in some cases, when a user input applied to the first input motor causes the output motor to rotate 1 degree, the updated target position for the input motor may move 2 degrees by applying a 2× scaling factor.

The output motor controller, having received user input information from the first input motor, then causes the output motor to apply a torque. Upon rotating the output motor, the output motor encoder determines a new angular position of the output motor (if one exists) and passes that angular position information to the output motor controller. The output motor controller distributes the output motor position information to both the first and second input motor controllers (subject to any necessary scaling), and that information is used by the first and second input motor controllers to update target motor position for both input motors. In this way, both input motors are held (or attempted to be held) in position according to the position of the output motor and in the same position as each other, and users at both input motors experience haptic feedback accordingly (see description above).

Systems like those described in FIG. 4 can be implemented where dual inputs are helpful such as in aircraft where input redundancy is needed for both pilots to control the aircraft. Input redundancy can also be useful in many other contexts, including for training purposes, where having a primary and secondary operator of a set of controls is needed. In some embodiments, multiple systems as shown in FIG. 4 can be operated together to allow for the control of multiple degrees of freedom. For example, many aircraft feature redundant controls, where each pilot has a yoke. Multiple systems of the inventive subject matter as described in FIGS. 1 and 4 can be implemented to allow for control of both roll and pitch by each pilot such that each pilot receives haptic feedback.

Figure 5:
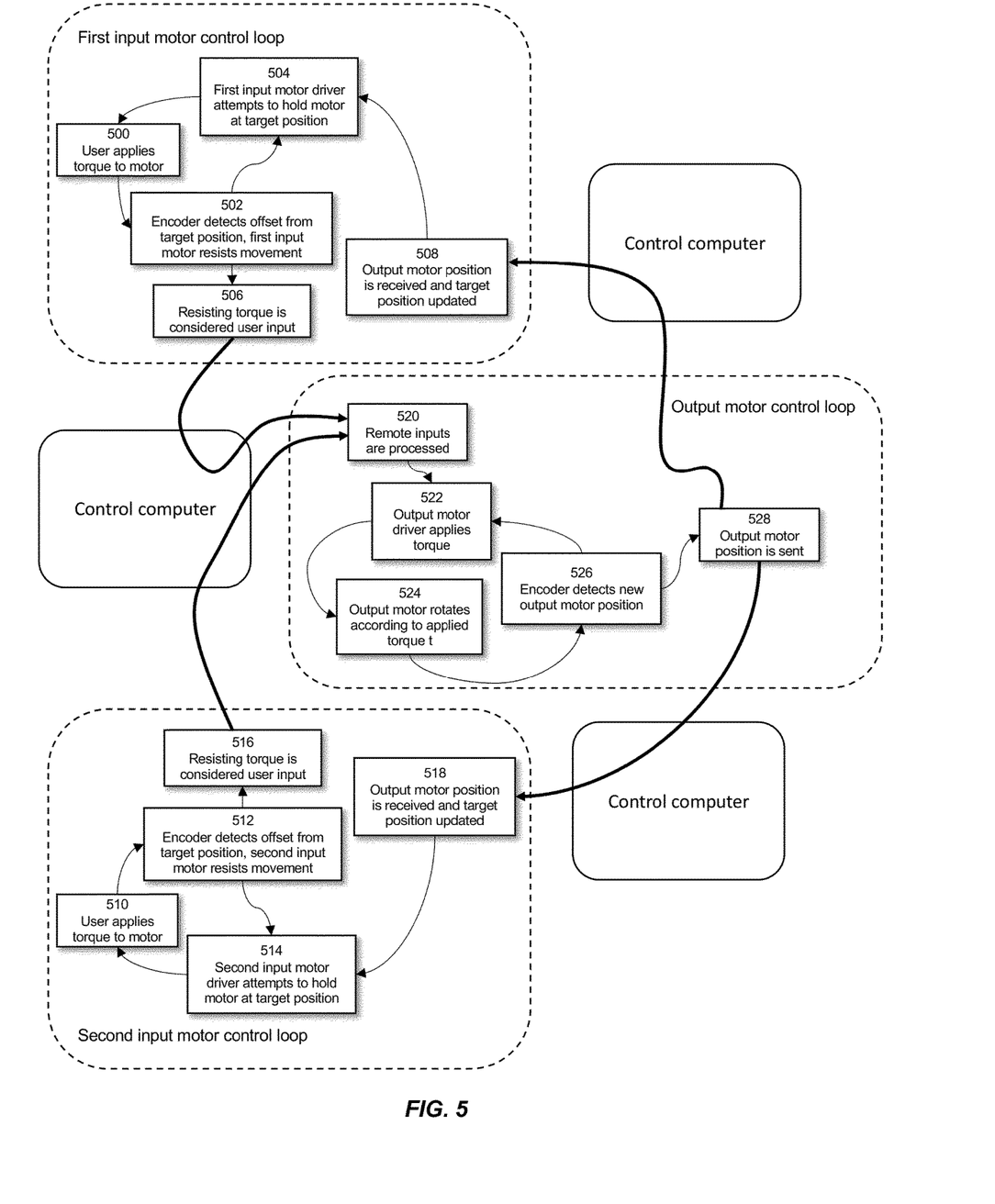
FIG. 5 is a flowchart describing interactions between two input motor control loops and one output motor control loop.

FIG. 5 is a flowchart describing how a system of the inventive subject matter like the one shown in FIG. 4 can function. Steps are grouped based on the different subsystems they are associated with, including the first input motor control loop, the second input motor control loop, and the output motor control loop. According to step 500 of the first motor control loop, a user applies some torque resulting in an angular displacement to the first input motor.

Upon receiving that input, the first motor driver detects the first input motor's angular position, which creates an offset (e.g., a difference between a target position and a new position). This offset is detected by the first input motor's encoder. A target position for the input motor is set based on the output motor's position, which will be described in more detail below with regard to the output motor control loop. Once an offset is detected in the first input motor driver attempts to move the motor back to the target position from its offset position according to step 502. This action generates the haptic feedback experienced by the user. Because the target position is set by the output motor's position, the second input motor and the first input motor are effectively tied together via the output motor's position because they each share a common target position.

The torque generated by the first input motor to bring it to the target position is thus considered as the first user's input to the system, and that first user's input is then transmitted to output motor control loop in step 506, so be discussed in more detail below. In step 508, a position of the output motor is received from the output motor control loop, and that position is used to update the first input motor's target position while the input motor is in the process of holding itself at the target position according to step 504. In other words, the target position can be updated continually while the system is in operation.

The first user's input is thus transmitted from the first input motor control loop to the output motor control loop according to step 506. Before the user's input is processed, it can, in some embodiments, be processed by a control computer. A control computer is shown in three different locations in FIG. 5 for convenience of visualization. In some embodiments, there is only one control computer, while in other embodiments multiple control computers can be implemented. In embodiments having a control computer, the control computer can handle collecting additional information from the system, vehicle, aircraft, etc. that the control system is implemented into. This allows for modification to a user's input according to real-time conditions and circumstances that are otherwise external to the control system. In some instances, conditions and circumstances external to the control system will impact how a system must be controlled—for example, an aircraft's flight computers may need to make adjustments to a pilot's inputs such that the aircraft carries out the pilots intended output of a pilot even if the literal output does not match the literal input necessary to bring about that intended output.

Similar steps take place in the second input motor control loop. In step 510 of the second motor control loop, a second user applies some torque resulting in an angular displacement to the second input motor. Upon receiving the second user's input, the second motor's encoder detects the second input motor's angular position, which creates an offset (e.g., a difference between a target position and a new position). This offset is detected by the second input motor's encoder, and torque is generated by the second input motor to bring it back to its target position from its offset position according to step 512. As with the first input motor, a target position for the second input motor is set based on the output motor's position. Once an offset is detected in step 512, in step 514, the second input motor driver attempts to move the motor to the target position from its offset position. This action generates the haptic feedback experienced by the second user while providing force as an input into the system. Because the target position is set by the output motor's position, the second input motor and the first input motor are effectively tied together via the output motor's position because they each share a common target position.

The torque generated by the second input motor to return it from its offset position to its target position is thus considered as the second user's input to the system, and that second user's input is transmitted to the output motor control loop in step 516. In step 518, a position of the output motor is received from the output motor control loop, and that position is used to determine a new target position for the first input motor, which is then used to measure angular position offset as the control loop continues. A second user's input is thus transmitted from the second input motor control loop to the output motor control loop according to step 516. Before the second user's input is processed, it can, in some embodiments, be processed by a control computer, as described above regarding the first input motor control loop.

In step 520, remote inputs are processed by the output motor control loop. The step of processing can involve applying any scaling or changes to the inputs to create a desired output. After processing incoming input data, the output motor generates torque according to the user inputs in step 522. By applying torque according to the user inputs, the output motor rotates, causing a change in angular position according to step 524. In step 526, the output motor's encoder detects the output motor's new position and the output motor's new position is sent to both input motor control loops according to step 528.

Regarding the first input motor control system, the actual position of the output motor is received at step 508, and regarding the second input motor control system, the actual position of the output motor is received at step 518. The output motor's position can be transmitted via a control computer as shown, where the control computer can adjust the data being transmitted prior to the data being received at the input motor control loops. In some embodiments, no adjustments are applied, and output motor position information is transmitted without changes. Output motor position is then used by each of the control loops to update target positions for each of the input motors according to steps 508 and 518 as described above.

Figure 6:
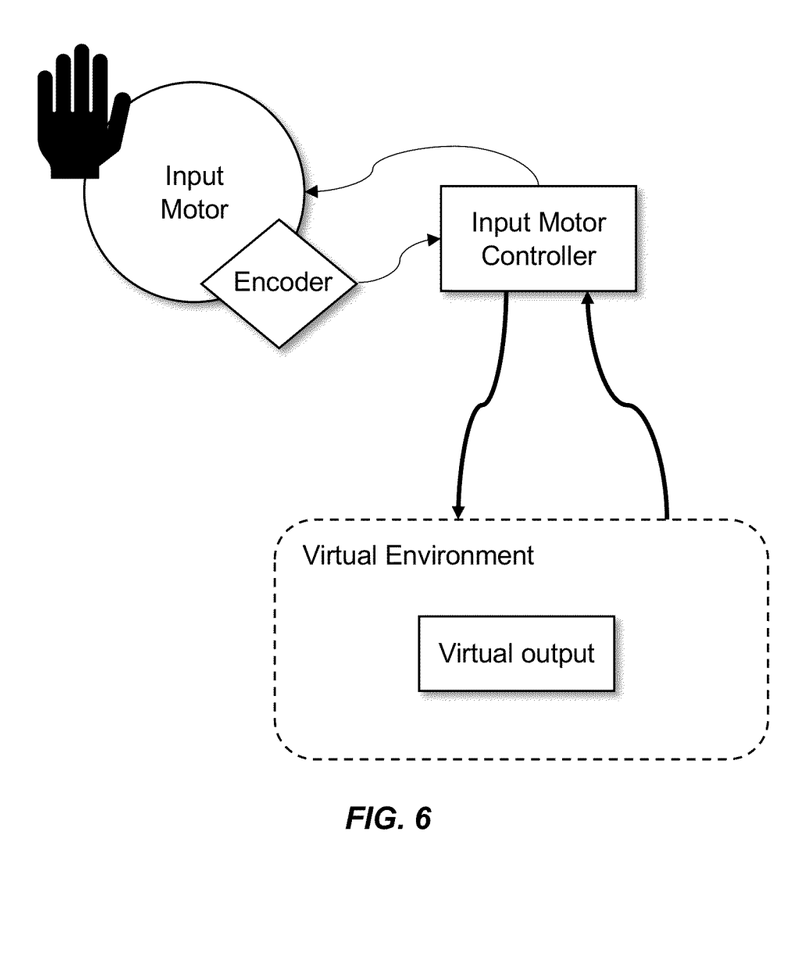
FIG. 6 is a schematic of a haptic feedback system having an input subsystem and a virtual output subsystem.

Some embodiments of the inventive subject matter can feature physical inputs to control virtual outputs. FIG. 6 shows one such example, though any of the embodiments described in this application as having an output motor can instead feature input control subsystems coupled with virtual output subsystems. FIG. 6 is modeled after the embodiment shown and described in FIG. 1. This embodiment features a physical input subsystem coupled with a virtualized output subsystem that exists within a virtual environment. In some embodiments, the virtual environment can be a video game, a simulation, or any other kind of computer-generated environment within with an output subsystem of the inventive subject matter may be useful. For example, for flight simulators, a real physical input can be implemented in association with a virtual output to give users the experience of hyper-realistic flight controls where the haptic feedback reflect conditions the aircraft experiences in the virtual environment. In another example, a virtual camera system can be created in a virtual environment that is controllable by a human operator. This can be useful where human camera operation within a virtual environment is needed, and the human operator is accustomed to or otherwise wants the feel of a real, physical camera system.

Thus, the input subsystem comprises an input motor, an input motor controller, and an encoder. This input subsystem works the same as those described above: when a user applies a torque to the input motor, the torque results in an offset of the input motor's position from a target position, and the input motor generates torque to bring itself back to the target position in response. The torque generated by the input motor is considered the user input, and the user input is transmitted to the virtual environment. In some embodiments, the virtual environment can apply any scaling or modifications to the user input that are needed to make the user input interpretable by the output subsystem. For example, the virtual environment can be created by a game engine, and the output subsystem in the virtual environment could be the steering wheel of a car that the user is driving subject to the rules of that game engine.

When the virtual environment receives that user input, the virtual environment can, in response, create updated angular position information to send back to the input subsystem so the input motor's target position can be updated. Angular position information can be generated according to conditions that exist in the virtual environment. For example, the virtual environment can feature friction forces, wind resistance, loading, and so on. Based on the amount of torque applied by a user to the input motor, the virtualized output motor can apply a virtual torque giving rise to rotation of a virtual output motor. The new position of the virtual output motor is then used to update the input motor's target position.

In embodiments comprising a physical input system coupled with a virtual output, there is no requirement that the virtual output comprise a motor having rotational output. Torque applied to the input motor can be translated for use with any type of virtual actuator as long as the movement of that virtual actuator resulting from a user's input is translated into an updated target position for the input motor, which is necessary for the haptic feedback aspect of the input subsystem to function.

As with other embodiments described in this application, it is contemplated that multiple input subsystems can operate in association with a single output subsystem, even when the single output subsystem is virtualized.

Figure 7:
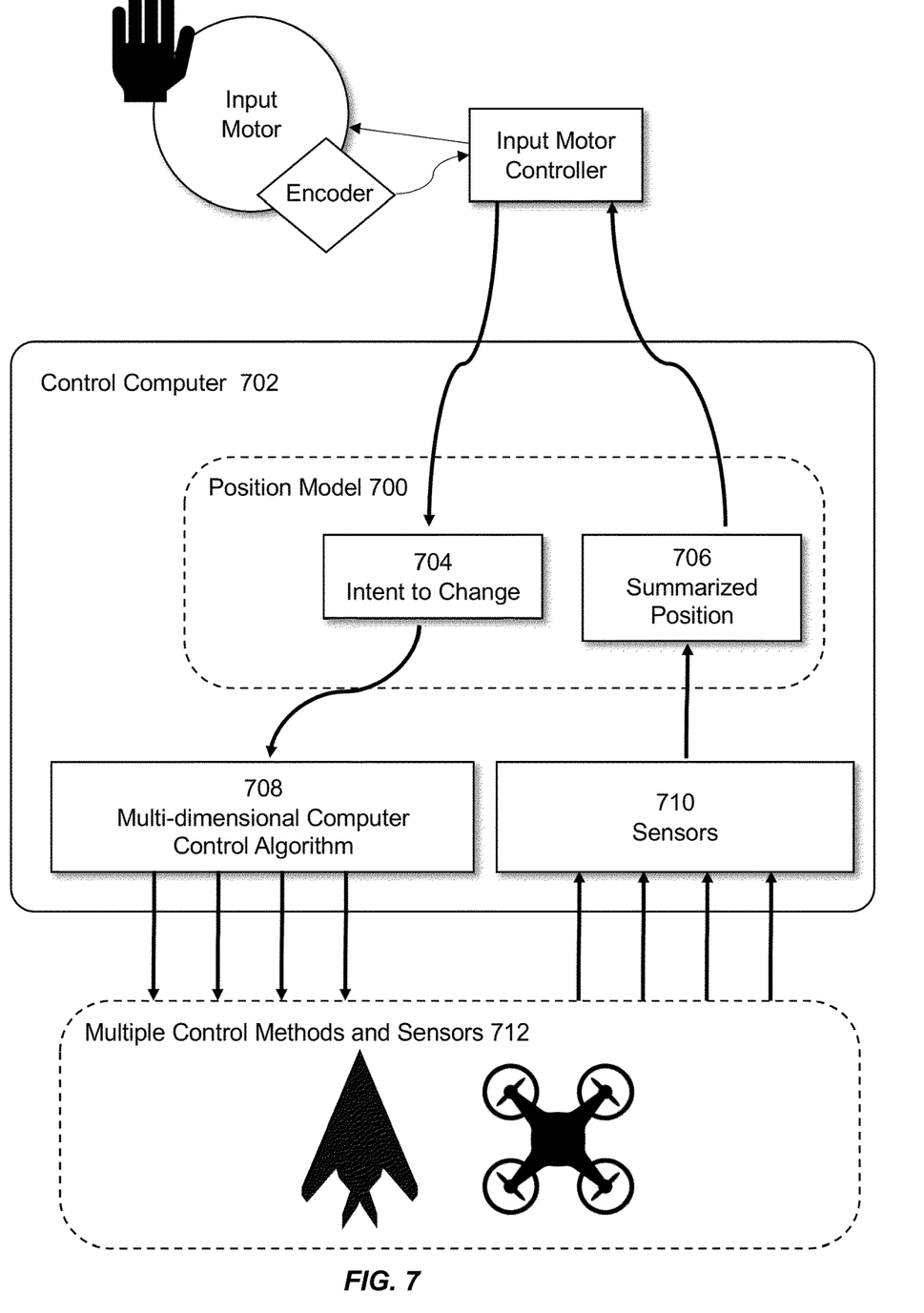
FIG. 7 is a schematic of a haptic feedback system having an input subsystem and a computer-controlled output subsystem.

Some embodiments of the inventive subject matter can enable simplified control of complex multi-dimensional algorithmic control systems. FIG. 7 shows how embodiments of the inventive subject matter can facilitate haptic interaction with digital, non-tactile interfaces. Examples of complex multi-dimensional algorithmic control systems include quad copters and complex aircraft that do not allow operators to directly manipulate control surfaces due to design considerations. In these systems, user intent is fed into the control algorithm which balances multiple control methods, sensors and state considerations as illustrated in block 712, which represents multiple control methods and sensors. In some such systems, an operator has no feedback and has to express their intent based solely on their understanding of readouts, screens, awareness and their practice with the system. FIG. 7 is modeled after the embodiment shown and described in FIG. 1. This embodiment features control computer 702, which maintains a digital position model 700. Position model 700 is a symbolic representation of a system state that can be conceptualized as a "position." A user can act on this model by, e.g., applying force to it and receiving feedback from it as its position changes. In an aircraft or quad copter, this position model can reflect the relative trajectory or velocity vector of a vehicle. The input (e.g., torque data) into the system is interpreted by the system as the operator's intent to change 704 for the control computer 702 to change the position state of the system via its internal multi-dimensional computer control algorithm 708. Such systems require numerous sensors 710 that send information back to the position model 700 to generate a summarized position 706.

Position model 700 thus receives torque input and transmits position output back to the input motor exactly as an output motor would in other examples described in this application, except in this case there is a digital position model that is manipulated by user input.

So as an operator applies force to an input motor, the input motor's position will change. In response, the input motor will feel to the operator as if they are directly adjusting the position of an output motor. It is not necessary that the algorithm provide direct feedback to the model. In some embodiments, the algorithm's successful or unsuccessful control of the system based on a user's intent is embodied in sensor feedback and a summarized position. If a user tries to modify the position in a way the algorithm 708 cannot complete, the operator will immediately experience haptic feedback indicating a lack of movement because the position will not perceptibly change despite the input force. If the algorithm fails to maintain stability (for example a quad copter motor fails), the user will experience haptic feedback to this effect as well as the position state changes in response to the failed motor. In this way, forces that are not directly a function of output motor forces can be felt by a user, and users can receive haptic feedback from systems that are traditionally too complex for operators to experience such haptic feedback.

Thus an operator and a system's control algorithm's capabilities achieve what amounts to a high fidelity relationship. Position changes at an output that are typically difficult (e.g., slow, require more energy, or other conceptual "cost") for a system to accomplish can be experienced by a user as having heft or weight according to the haptic feedback the user experiences in real time. Often, complex algorithmically controlled systems experience gradual performance loses as they near the edge of performance capability. In systems without feedback, as the operator pushes the system to the limit, the gradation or scaling of performance difficulty cannot be experienced by the user. Instead, it is only detected if they are fully aware of the state of the system (which can be difficult in all weather conditions, remote control applications, high-performance applications, and so on). With a haptic feedback-based system, as the systems nears a performance capability limit, the limit can be experienced by the user via increasing input force requirements (e.g., haptic feedback) and slower response on the input motor. Such systems not only provide haptic feedback indicating to a user the system's performance limitations, such a system can also allow users to learn how certain types of movements require different amounts of input force as a performance limit is approached and where/ when/under what circumstances the system approaches those limits. Over time, an operator's mental model of system movements will align more closely to the algorithm's actual capabilities, improving not only real-time situational awareness but fundamental performance expectations.

Thus, specific systems and methods directed to haptic feedback control systems have been disclosed. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A haptic feedback control system, comprising:
   an input subsystem comprising:
      an input PCB (Printed Circuit Board) stator motor;
      an input motor controller;
      an input motor encoder;
   an output subsystem comprising:
      an output motor;
      an output motor controller;
      an output motor encoder;
   wherein the input motor controller is configured to detect an input torque applied to the input PCB stator motor;
   wherein user input comprising the input torque is transmitted from the input subsystem to the output subsystem;
   wherein the output motor is configured to generate output torque according to the user input;
   wherein the output motor encoder is configured to detect an output motor angular position;
   wherein output motor position information comprising the output motor angular position is transmitted from the output subsystem to the input subsystem;
   wherein a target position for the input PCB stator motor is updated based on the output motor position information; and
   wherein haptic feedback is generated in the input PCB stator motor according to an offset of the input PCB stator motor from the target position resulting from the input torque.

2. The system of claim 1, wherein the output motor comprises a PCB stator.

3. The system of claim 1, wherein the target position is a function of the output motor angular position.

4. The system of claim 1, wherein the input subsystem and the output subsystem are configured to communicate via a comms layer.

5. The system of claim 4, wherein the comms layer comprises a control computer configured to change the user input and the output motor position information.

6. A haptic feedback control system, comprising:
   an input subsystem comprising an input PCB (Printed Circuit Board) stator motor;
   an output subsystem comprising an output motor;
   wherein the input subsystem is configured to detect a user input to the input PCB stator motor;
   wherein user input is transmitted from the input subsystem to the output subsystem;
   wherein the output motor is configured to generate an output torque according to the user input; and
   wherein the input PCB stator motor is configured to generate haptic feedback based on an angular position of the output motor resulting from applying the output torque to the output motor;
   wherein the haptic feedback is based on a target position of the input PCB stator motor that is assigned based on the angular position of the output motor after applying the output torque.

7. The haptic feedback control system of claim 6, wherein the user input comprises torque information.

8. A haptic feedback control system, comprising:
   a first input subsystem comprising a first input PCB (Printed Circuit Board) stator motor;
   a second input subsystem comprising a second input PCB stator motor;
   an output subsystem comprising an output motor;
   wherein the first input subsystem is configured to detect a first user input to the first input PCB stator motor;
   wherein the second input subsystem is configured to detect a second user input to the second input PCB stator motor;
   wherein a combined user input comprising the first user input and the second user input is transmitted from the first input subsystem and the second input subsystem to the output subsystem;
   wherein the output motor is configured to generate an output torque according to the combined user input;
   wherein the first input PCB stator motor is configured to generate a first haptic feedback based on a position of the output motor resulting from applying the output torque to the output motor; and
   wherein the second input PCB stator motor is configured to generate a second haptic feedback based on the position of the output motor resulting from applying the output torque to the output motor.

9. The haptic feedback control system of claim 8, wherein the combined user input comprises torque information.

10. The haptic feedback control system of claim 9, wherein the torque information is a combination of first user input and second user input.

11. The haptic feedback control system of claim 10, wherein the first haptic feedback is based on a first angular position of the first input PCB stator motor compared to a first target position of the first input PCB stator motor, and wherein the second haptic feedback is based on a second angular position of the second input PCB stator motor compared to a second target position of the second input PCB stator motor.

12. The haptic feedback control system of claim 11, wherein the first target position and the second target position are based on the position of the output motor resulting from applying the output torque to the output motor.

* * * * *